Nov. 5, 1940.  W. J. D. VAN DIJCK ET AL  2,220,558
DETONATION SUPPRESSION SYSTEM FOR INTERNAL COMBUSTION ENGINES
Filed May 9, 1939
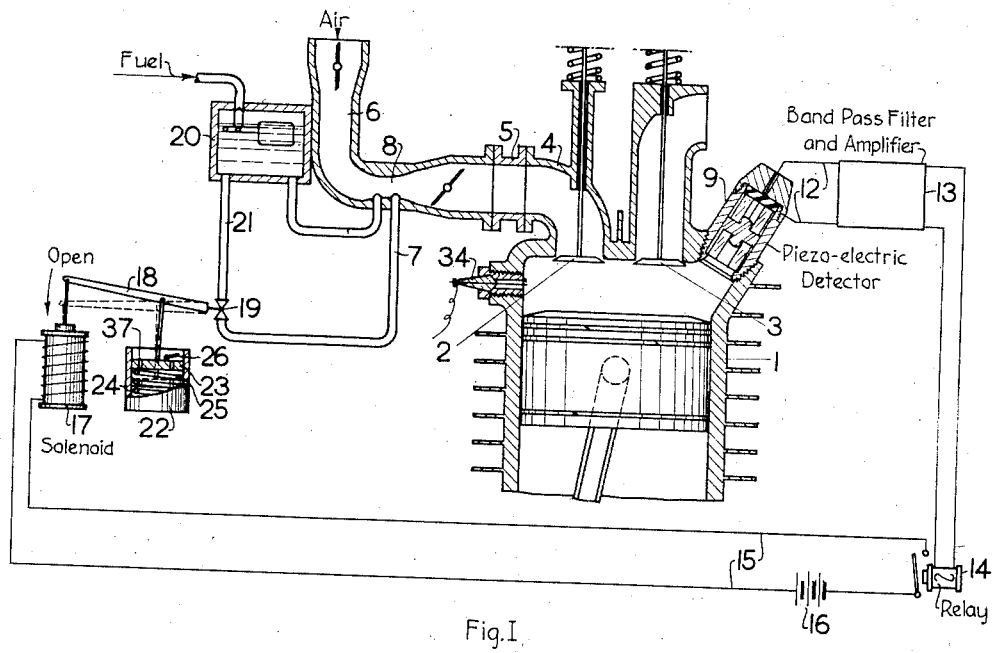
Fig. I.
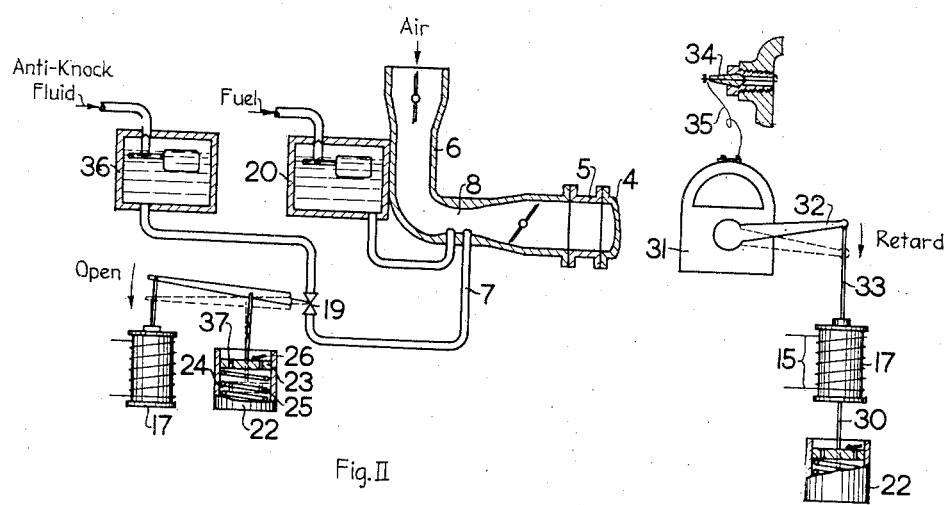
Fig. II.
Fig. III.
Inventors: Willem J. D. van Dijck
Johannes J. Broeze
Lambertus A. Peletier
Hendrik van Driel
By their Attorney: H. Burch Patented Nov. 5, 1940

2,220,558

UNITED STATES PATENT OFFICE 2,220,558

DETONATION SUPPRESSION SYSTEM FOR INTERNAL COMBUSTION ENGINES

Willem Johannes Dominicus van Dijck, The Hague, and Johannes Jan Broeze, Lambertus Adrianus Peletier, and Hendrik van Driel, Delft, Netherlands, assignors to Shell Development Company, San Francisco, Calif., a corporation of Delaware Application May 9, 1939, Serial No. 272,582
In the Netherlands May 13, 1938

13 Claims. (Cl. 123—198)

The present invention relates to methods and apparatus for automatically precluding or preventing detonation in internal combustion engines.

Detonation, as is known, is a phenomenon occurring in internal combustion engines improperly adjusted or under severe conditions of operation. Except under extreme conditions, detonation does not affect the power output of the engine. However, even moderate detonation will seriously damage the motor, if not eliminated.

The occurrence of detonation in an engine is dependent upon the design of the engine, the nature of the fuel used and also upon the operating conditions of the engine. It is an object of the present invention to minimize or eliminate detonation by control of this last factor. Further, it is an object of this invention to arrange such control so as to be entirely automatic and independent of the engine operator.

As examples of operating conditions that will affect the occurrence of detonation may be cited the fuel-air ratio, the temperature of the intake air of the mixture, the quantity of the mixture introduced into a cylinder per working stroke, the temperature of the piston and cylinder, the timing of ignition and the characteristics of the fuel being used. Detonation bears a definite relationship to the power output required of the engine; in general it may be said that the detonation tendency increases as the power output demand increases. Thus, when an engine is temporarily overloaded, such as that of an aeroplane during the take-off or a rapid climb, the risk of detonation is greatly increased.

Since, as stated above, the occurrence of detonation depends on many conditions, the modification of these conditions may lead to a suppression of the detonation. The engine control members may serve to modify the quantity or quality of the fuel, to change the ratio of fuel to air in the mixture, to affect the temperature of the air introduced, to change intake manifold pressure or to change the composition of the fuel (by addition of anti-knock dopes or water). They may serve to modify the conditions of ignition and combustion in the cylinder by changing the ignition timing, and intensity of the cylinder cooling, or to alter the engine speed. Further, they may serve to alter the load of the engine by changing the gear-ratio through a transmission, or in the case of aircraft engines driving a variable-pitch propeller by changing the pitch of the blades which may in turn act to alter one or more of the above-mentioned factors.

Manipulation of any or all of these controls will have an immediate influence upon the intensity and duration of the detonation phenomenon.

Of the various possibilities of control use is preferably made of those which entail little, if any, decrease in the power output of the engine. Apart from the possibilities of control offered by changing the composition of the fuel (changing to a fuel with a higher anti-knock value or adding special agents for counteracting detonation), change of the fuel-air ratio, and ignition timing, the quantity of fuel introduced, offer the simplest means of control without undue modification of the existing conventional control members.

According to the present invention apparatus is arranged so that a member susceptible to detonation (a "knock-detector") operates one or more of the control members of the engine in such a manner that as soon as detonation occurs, operating conditions are modified in the sense of suppressing detonation.

The engine control members used may be especially designed for the purpose of detonation suppression according to the present system; however, this is not always necessary, for in many cases the members already present will suffice.

It is of primary importance that the detonation-detecting member should react quickly and at incipient detonation in order that the suppression or reduction of detonation is attained before it has assumed harmful proportions. It is known that detonation is accompanied by pressure waves within the cylinder and that the pressure wave frequencies correspond to the resonances of the cylinder charge.

A knock detector which reacts on those pressure waves has been found to be very useful. As, however, the frequencies of these pressure waves occurring during detonation will vary with different engines, it is necessary to calibrate or adjust such knock detectors to those frequencies at which detonation is actually present in the cylinders to be controlled.

For proper functioning of the apparatus it is necessary, of course, that the susceptible member react only within that range of frequencies where detonation occurs. If the motor to be controlled develops vibrations (due to valves, cams, tappets, etc.) within the frequency range of the detector member, apparatus should be included in the arrangement that will filter such non-detonation vibrations from the system prior to their actually reaching the control-actuating means.

As previously mentioned, an increase in the fuel to air ratio of the mixture delivered to the cylinders is one of the best ways of eliminating detonation. Detonation is often caused by the operator reducing the amount of fuel in his mixture beyond a safe limit in an attempt to reduce the fuel consumption of the engine. By the aid of this invention the proportion of fuel in the mixture can be reduced to minimum without destructive detonation occurring in the engine cylinders.

The accompanying schematic drawing will serve to illustrate several of the possible specific arrangements according to the invention.

Figure I illustrates an arrangement whereby the fuel-air ratio is modified to suppress detonation.

Figure II illustrates a similar arrangement, whereby an extra supply of dope or high octane fuel or a knock-suppressing fluid is admitted to obtain the desired suppression.

Figure III illustrates an arrangement for suppressing detonation by change in the ignition timing.

Referring to Figure I, numeral 1 represents the cylinder of an air-cooled internal combustion engine (only part of which is shown) having an inlet valve 2 and exhaust valve 3 mounted in the head of the cylinder. Connected to the inlet port 4 of the cylinder is an intake pipe 5, which is in turn attached to a carburetor 6, which is of normal construction with the exception of a supplemental fuel jet 7 in the Venturi section 8 of the carburetor, which will be described later herein. Attached to the cylinder 1 is a detonation- or vibration-responsive device 9, which in the illustrated embodiment comprises a piezo-electric detonation-responsive device, such as is well known in the art. Other vibration-responsive devices, for example, a mechanical type as described in U. S. application Serial No. 40,752, or those of the magnetic induction type, may be used, if preferred.

The vibration-responsive device or detonation detector 9 is connected by insulated electrical leads 12 to a band pass filter and amplifier unit 13. In unit 13 the band pass filter is arranged only to allow frequency cycles within the range of detonation occurrence to pass.

The leads 12 carrying the output of the amplifier are connected to an electrical relay 14, which serves to open and close a secondary circuit 15, which may be called the "detonation-correcting circuit."

In this circuit a battery 16 is connected by means of the relay 14 with solenoid 17. The core of the solenoid is attached to an arm 18 operating a valve 19 in the line 21 connecting the float chamber 20 to the supplemental jet 7 of the carburetor 6. Attached to the arm 18 is dampering device 22, which consists of a plunger 23 mounted in a cylinder 24 filled with a suitable fluid, for example, a castor oil-alcohol mixture. A spring 25 is located in the cylinder 24 on the underside of the plunger 23 and tends to return the plunger to a mid-point in the cylinder. A small opening 37 through the plunger allows liquid slowly to pass from one side of the plunger to the other upon movement of lever 18. A one-way valve 26 through the plunger allows liquid quickly to pass from the underside of the plunger to the top upon downward movement of lever 18.

The operation of the control is as follows: Upon vibrations of detonating frequency occurring in cylinder 1 a corresponding electrical impulse is created by the compression of the piezo-electric crystals in the detector 9. These impulses are then amplified and the band pass filter eliminates any current of undesired frequencies. The resulting current is employed to operate the relay 14.

The relay 14 closes the circuit 15 containing the battery 16 and solenoid 17. The solenoid, upon being thus energized, causes a movement of lever arm 18 so as to open the valve 19 in the fuel line 21 allowing fuel to pass to supplemental jet 7 from the float chamber 20 of the carburetor 6, thus enriching the mixture passing into the cylinder 1, which will eliminate the detonation.

The dampering device 22 serves to slow down the movement of the arm 18, especially when going in the direction of decreasing fuel-air ratio, thus preventing too sudden changes in mixture ratio, which would tend to disturb the even running of the engine.

In Figure II an arrangement is shown which is almost similar to the embodiment illustrated in Figure I. In the case illustrated in Figure II, however, the supplemental jet 7 is connected to receive fluid e. g. from a separate float chamber 36 containing an anti-knock dope or a fuel of higher octane number or a knock-suppressing fluid, this auxiliary supply being controlled by valve 19.

The operation of this arrangement is as follows: Completion of circuit 15, upon the occurrence of detonation, will activate solenoid 17, pull down lever arm 18 so as to open the valve 19 in the line 21, allowing fluid to pass from the float chamber 36 to supplemental jet 7, thus increasing the anti-knock value of the air-fuel mixture passing through the intake manifold to the cylinder, which will eliminate detonation.

In Figure III a conventional magneto 31, having a lever 32 for advancing or retarding the ignition timing, is connected by wire lead 35 to a spark plug 34 located in the engine cylinder. A link 33 connects lever 32 with solenoid 17, which is in turn connected by link 30 to plunger 23 of dampering device 22. Wires leading from solenoid 17 form a circuit 15 as shown in Figure I.

Completion of circuit 15 as shown and described in relation to Figure I will activate solenoid 17 and pull link 33, which will in turn move lever 32 of magneto 31 so as to retard temporarily the ignition timing and thus suppress detonation. Elimination of detonation will break circuit 15 and thus return lever 32 to its normal operating position through the action of dampering device 22.

In the above-described embodiments the invention has been illustrated as applied to a single cylinder of an engine, but it will be realized that application to more than one cylinder can be made. For example, a vibration indicator may be attached to each cylinder and the indicators periodically connected to the filter and amplifier 13.

It will be seen that by the above invention it is possible to operate an internal combustion engine at the most efficient fuel consumption point for the particular engine speed and power desired. At present, for example, it is a practice in aircraft operation to run the motor on an unnecessarily rich mixture in order to avoid possible damage to the engine through detonation. As a result cruising range or pay load is reduced. The automatic regulation of the fuel-air mixture to closer limits, as described herein, will result in greater efficiency, without danger of damage to the engine.

Those skilled in the art will recognize the advantages of the present invention over the existing arrangements designed to avoid detonation. For example, in the conventional automatic ignition control systems the ignition timing is modified in response to changes in the manifold gas pressures. With such an arrangement it is impossible to advance or retard the time of ignition in response to detonation, as manifold gas pressure changes are neither a positive nor sufficiently sensitive indication of the occurrence or non-occurrence of detonation.

The present invention, being instantly sensitive to the presence of detonation, will operate in an immediate and positive manner to eliminate such phenomena.

We claim as our invention:

1. An arrangement for suppressing detonation in an internal combustion engine having control members to adjust the working conditions of said engine, comprising means sensitive to pressure vibrations occurring within the cylinders of said engine and capable of converting said pressure vibrations into electrical vibrations, said electrical vibrations actuating means for automatically operating said control members in accordance with the occurrence of detonation.

2. An arrangement for suppressing detonation in an internal combustion engine having control members to adjust the working conditions of said engine, comprising means sensitive to structural vibrations of the cylinders of said engine as caused by detonation and capable of converting said structural vibrations into electrical vibrations, said electrical vibrations actuating means for automatically operating said control members in accordance with the occurrence of detonation.

3. In combination with an internal combustion engine a circuit comprising a detonation indicator connected to the cylinder wall of said engine, a band pass filter and amplifier unit, a relay, means actuable by said circuit and adapted automatically to operate control members for adjusting the working conditions of said engine in accordance with the occurrence of detonation.

4. In combination with an internal combustion engine having a carburetor and an auxiliary fuel supply means a circuit comprising a detonation-sensitive device connected to the cylinder wall of said engine and capable of converting pressure vibrations into electrical vibrations, an amplifier, a relay, a second circuit comprising said relay, a source of electrical energy and a solenoid, a dampering means in conjunction with a valve controlling the flow of fuel to said auxiliary fuel supply means, whereby activation of said first-described circuit will activate said second-described circuit, said second-described circuit being adapted to control the operation of said valve.

5. An arrangement for suppressing detonation in an internal combustion engine having normal fuel injection means and auxiliary fluid injection means, comprising detonation-sensitive apparatus connected to the cylinder wall of said engine and capable of producing electrical vibrations upon the occurrence of detonation in said cylinder, means for amplifying said electrical vibrations, a relay, said relay being adapted to activate a circuit comprising a source of electrical energy and a solenoid upon the occurrence of detonation in said cylinder, means operable by said solenoid to induce fluid introduction to said auxiliary fluid injection means and to prevent further auxiliary fluid injection when detonation ceases in said cylinder.

6. An arrangement for suppressing detonation in an internal combustion engine having normal fuel injection means and auxiliary fluid injection means, comprising detonation-sensitive apparatus connected to the cylinder wall of said engine and capable of producing electrical vibrations upon the occurrence of detonation in said cylinder, means for amplifying said electrical vibrations, a relay, said relay being adapted to activate a circuit comprising a source of electrical energy and a solenoid upon the occurrence of detonation in said cylinder, means operable by said solenoid to retard the ignition timing of said engine in accordance with the occurrence of detonation.

7. An ignition timing control for an internal combustion engine comprising, a detonation sensitive device operative to generate a small electric current when subjected to detonation induced vibration, and means including an amplifying circuit, and a motor for controlling the timing of the ignition spark when energized by said detonation sensitive device.

8. In combination with an engine having one or more cylinders each having a combustion chamber equipped with electric ignition means, and an engine driven current interrupter for timing the ignition spark to each cylinder, means for automatically controlling the timing of said spark to avoid detonation in said cylinders comprising, a device operative to generate electric energy when subjected to detonation induced vibration secured to each cylinder or to one or more selected cylinders, a motor for changing the position of said interrupter, a solenoid for controlling said motor, and an amplifying device between said generating device and said solenoid.

9. In combination with an engine having one or more cylinders each having a combustion chamber, means for automatically controlling the timing of the ignition to avoid detonation in said cylinders comprising a device operative to generate electric energy when subjected to detonation induced vibration secured to each cylinder or to one or more selected cylinders, a motor for changing the moment of ignition, a solenoid for controlling said motor, and an amplifying device between said generating device and said solenoid.

10. An arrangement for suppressing detonation in an internal combination engine having a plurality of cylinders and having control members to adjust the working conditions of said engine, comprising a detonation sensitive device secured to each of several cylinders, each device being capable of converting pressure vibrations occurring within the cylinders into electrical vibrations, said electrical vibrations actuating means for automatically operating said control members in accordance with the occurrence of detonation, and means for periodically connecting said detonation sensitive devices to operate said control members.

11. An arrangement for suppressing detonation in an internal combustion engine having a plurality of cylinders and having a timing control member, comprising a detonaiton sensitive device secured to each of several cylinders, each device being capable of converting pressure vibrations occurring within the cylinders into electrical vibrations, means including a motor and an amplifier for automatically operating said timing control member, and means for periodically connecting said detonation sensitive devices to operate said timing control member.

12. An arrangement for suppressing detonation in internal combustion engines having control members to adjust the working conditions of said engine comprising a detonation sensitive device operative to generate a small electric current when subjected to detonation induced vibration, and means including an amplifying circuit and a motor for actuating said control members when energized by said detonation sensitive device.

13. An auxiliary fuel injection control for an internal combustion engine having auxiliary fuel injection means comprising, a detonation sensitive device operative to generate a small electric current when subjected to detonation induced vibration, and means including an amplifying circuit and a motor for actuating said auxiliary fuel injection means when energized by said detonation sensitive device.

WILLEM JOHANNES DOMINICUS VAN DIJCK.
JOHANNES JAN BROEZE.
LAMBERTUS ADRIANUS PELETIER.
HENDRIK VAN DRIEL.

CERTIFICATE OF CORRECTION.

Patent No. 2,220,558. November 5, 1940.

WILLEM JOHANNES DOMINICUS van DIJCK, ET AL.

It is hereby certified that error appears in the printed specification of the above numbered patent requiring correction as follows: Page 3, second column, line 55, claim 10, for "combination" read --combustion--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.